United States Patent
Putnam et al.

(10) Patent No.: US 11,379,728 B2
(45) Date of Patent: Jul. 5, 2022

(54) MODIFIED GENETIC RECOMBINATION OPERATOR FOR CLOUD OPTIMIZATION

(71) Applicant: Red Hat, Inc., Raleigh, NC (US)

(72) Inventors: Charles Putnam, Raleigh, NC (US); Daniel Wolf, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 593 days.

(21) Appl. No.: 16/243,998

(22) Filed: Jan. 9, 2019

(65) Prior Publication Data
US 2020/0218986 A1    Jul. 9, 2020

(51) Int. Cl.
| | |
|---|---|
| G06N 3/04 | (2006.01) |
| G06N 3/12 | (2006.01) |
| G06F 15/17 | (2006.01) |
| G06F 16/28 | (2019.01) |
| G06F 16/27 | (2019.01) |
| G06F 7/58 | (2006.01) |

(52) U.S. Cl.
CPC .............. *G06N 3/12* (2013.01); *G06F 7/588* (2013.01)

(58) Field of Classification Search
CPC ........... G06N 3/12; G06N 3/126; G06F 7/588
USPC ........................................................ 706/1–62
See application file for complete search history.

(56) References Cited

U.S. PATENT DOCUMENTS

| | | | | |
|---|---|---|---|---|
| 7,035,919 B1 * | 4/2006 | Lee | ...................... | H04L 67/1095 709/203 |
| 8,768,872 B2 | 7/2014 | Cantin | | |
| 9,154,366 B1 * | 10/2015 | Martin | ................ | H04L 41/5025 |
| 2005/0100232 A1 * | 5/2005 | Sakanashi | ............... | H03M 7/30 382/238 |

(Continued)

FOREIGN PATENT DOCUMENTS

| | | |
|---|---|---|
| CN | 105955927 A | 9/2016 |
| CN | 106845642 A | 6/2017 |
| CN | 108768465 A | 11/2018 |

OTHER PUBLICATIONS

Zhu et al., "Multi-dimensional Constrained Cloud Computing Task Scheduling Mechanism Based on Genetic Algorithm", Special Focus Paper, North China Electric Power University, Baoding, China, iJOE, vol. 9, Special Issue 6, Jul. 2013, pp. 15-18.

(Continued)

*Primary Examiner* — Brandon S Cole
(74) *Attorney, Agent, or Firm* — Womble Bond Dickinson (US) LLP (57) ABSTRACT

A multi-element problem may be solved iteratively by using a modified genetic algorithm to generate a plurality of solutions according to a set of solution criteria. The solution criteria may comprise a plurality of servers, each server including one or more attributes, and an indication of which of the one or more attributes are to be optimized. An index may be appended, by a processing device, to each solution in the plurality of solutions and the values in each solution may be sorted. For each solution in the plurality of solutions, (Continued)

one or more values from the solution may be combined with one or more values from another solution to generate a plurality of child solutions. Each child solution may have an index, and the values in each child solution may be sorted in view of the child solution's index. For one or more child solutions in the plurality of child solutions, two selected values may be rearranged to generate one or more mutated child solutions.

20 Claims, 6 Drawing Sheets

(56) References Cited

U.S. PATENT DOCUMENTS

| | | | |
|---|---|---|---|
| 2008/0028006 A1* | 1/2008 | Liu | G06F 16/273 |
| 2012/0005136 A1* | 1/2012 | Cantin | G06N 3/086 |
| | | | 706/13 |
| 2014/0279766 A1* | 9/2014 | Thompson | G06N 3/126 |
| | | | 706/14 |
| 2015/0106306 A1* | 4/2015 | Birdwell | G06N 3/02 |
| | | | 706/11 |
| 2015/0371135 A1* | 12/2015 | Sandeep | G06N 5/02 |
| | | | 706/13 |
| 2017/0011292 A1* | 1/2017 | Thompson | G06N 3/126 |
| 2018/0222043 A1* | 8/2018 | Trovero | G06F 16/285 |

OTHER PUBLICATIONS

"Constraint Optimization", OR-Tools, Google Developers, located at https://developers.google.com/optimization/cp/, Jul. 23, 2018, 2 pages.

"Business Optimization With Red Hat Decision Manager", Technology Overview, Red Hat, Inc., located at https://www.redhat.com/cms/managed-files/mi-business-optimization-decisionmanager-technology-overview-f10414kc-201801-en_0.pdf, 2018, 6 pages.

* cited by examiner

MODIFIED GENETIC RECOMBINATION OPERATOR FOR CLOUD OPTIMIZATION

TECHNICAL FIELD

Aspects of the present disclosure relate to genetic algorithms, and more particularly, to solving multi-element problems using genetic algorithms.

BACKGROUND

Genetic algorithms are a type of artificial intelligence algorithm used for solving complex problems with large numbers of elements. Such problems can include cloud network management and optimization, scheduling, resource optimization, vehicle routing, and stock management among others. Genetic algorithms typically start with a base solution pool, and find combinations of solutions that will maximize or minimize a certain element (referred to as unconstrained search optimization), thereby determining which solutions from a current pool of solutions are optimal. By continuing this process on an iterative basis, the optimal solutions found at each iteration can impact search attempts during subsequent iterations and thus result in a highly optimized solution for the given problem.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Genetic algorithms often decompose a problem into multiple elements and then iterate through each element, subsequently recombining the results to generate an optimized solution. However, because the result from each individual element is found independently of one another, the solution cannot be optimized across all elements simultaneously. Further, standard genetic algorithms are not capable of handling constraints for a given problem, which can limit their usefulness in modeling complex problems with large numbers of elements and numerous constraints on potential solutions. For example, in some solution spaces there cannot be two of the same element in a given solution. Thus, standard genetic algorithms will automatically throw out potential combinations between solutions that share an element, regardless of the potential of such combinations.

Aspects of the present disclosure address the above noted problems by using a processing logic to iteratively solve complex problems across an entire solution space using a modified genetic algorithm. A plurality of solutions may be generated based on solution criteria comprising a plurality of elements. Each solution may have one or more values that correspond to one or more of the elements in the solution criteria. In embodiments, a modified cross-over operator may be implemented that appends an index to each solution and sorts the values in each solution. A traditional cross-over operation is then performed to combine solutions in the plurality of solutions so as to obtain a plurality of child solutions, the values in each child solution being sorted in view of that child solution's index. Subsequently, for one or more child solutions, two randomly chosen values may be swapped, thereby generating one or more mutated child solutions. In some embodiments, a number may be randomly generated for each child solution, and child solutions having a random number greater than or equal to a predefined threshold may be mutated. In this way, a greater number of potential solutions may be considered, leading to more a highly optimized solution set.

Figure 1:
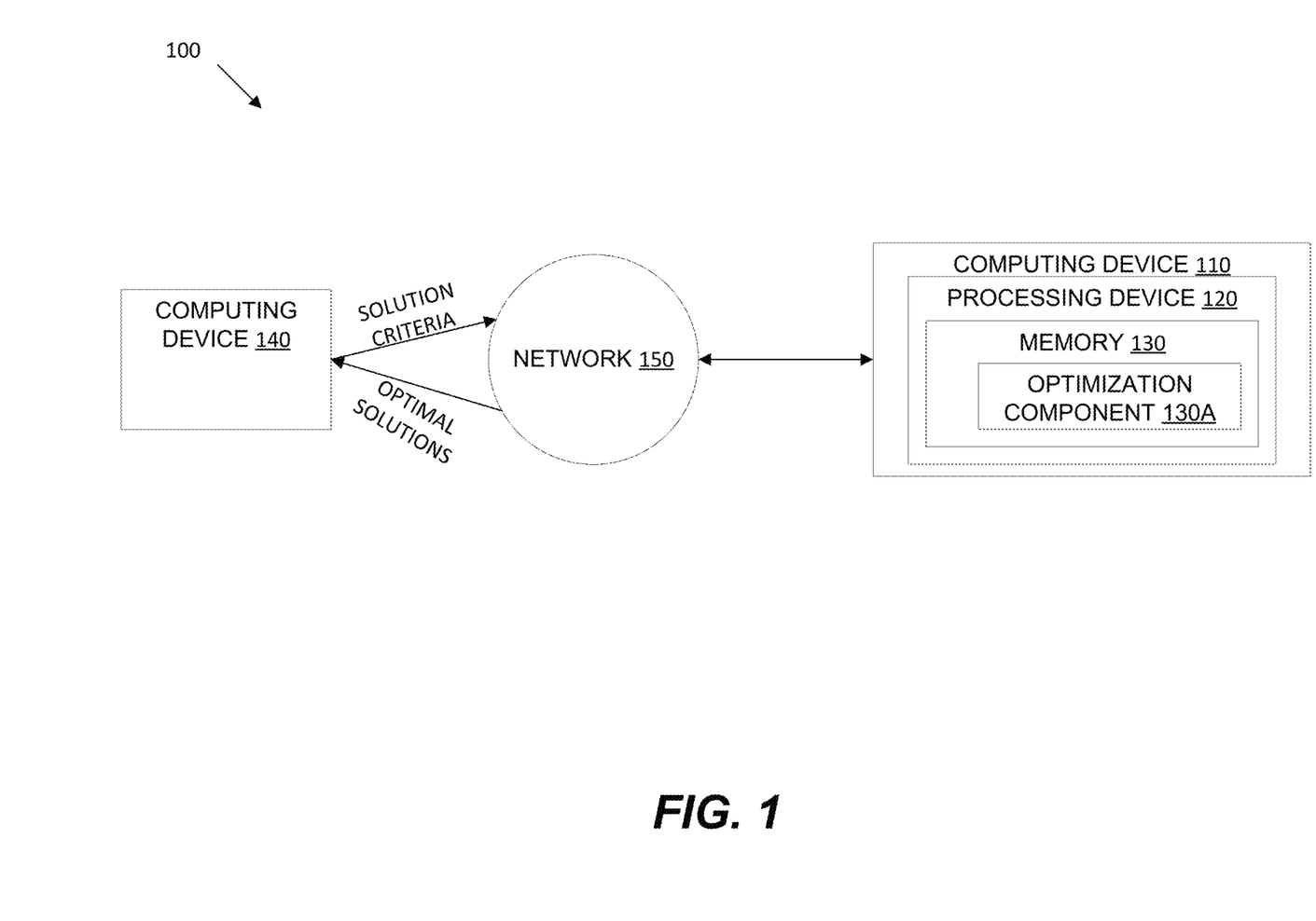
FIG. 1 is a block diagram that illustrates an example system, in accordance with some embodiments of the present disclosure.

FIG. 1 is a block diagram that illustrates an example system 100. As illustrated in FIG. 1, the system 100 includes a computing device 110 and a computing device 140. The computing device 110 may include a processing device 120 and a memory 130. The computing device 110 and the computing device 140 may be coupled to each other (e.g., may be operatively coupled, communicatively coupled, may communicate data/messages with each other) via network 150. Network 150 may be a public network (e.g., the internet), a private network (e.g., a local area network (LAN) or wide area network (WAN)), or a combination thereof. In one embodiment, network 150 may include a wired or a wireless infrastructure, which may be provided by one or more wireless communications systems, such as a wireless fidelity (WiFi) hotspot connected with the network 150 and/or a wireless carrier system that can be implemented using various data processing equipment, communication towers (e.g. cell towers), etc. The network 150 may carry communications (e.g., data, message, packets, frames, etc.) between computing device 110 and the computing device 140. The memory 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each computing device may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The computing devices 110 may comprise any suitable type of computing device or machine that has a programmable processor including, for example, server computers, desktop computers, laptop computers, tablet computers, smartphones, set-top boxes, etc. In some examples, the computing device 110 and the computing device 140 may comprise a single machine or may include multiple interconnected machines (e.g., multiple servers configured in a cluster). The computing device 110 and the computing device 140 may be implemented by a common entity/organization or may be implemented by different entities/organizations. For example, the computing device 110 may be operated by a first company/corporation and the computing device 140 may be operated by a second company/corporation. Both the computing device 110 and the computing device 140 may execute or include an operating system (OS). The OS of computing device 110 and the computing device 140 may manage the execution of other components (e.g., software, applications, etc.) and/or may manage access to the hardware (e.g., processors, memory, storage devices etc.) of the computing device.

Figure 2:
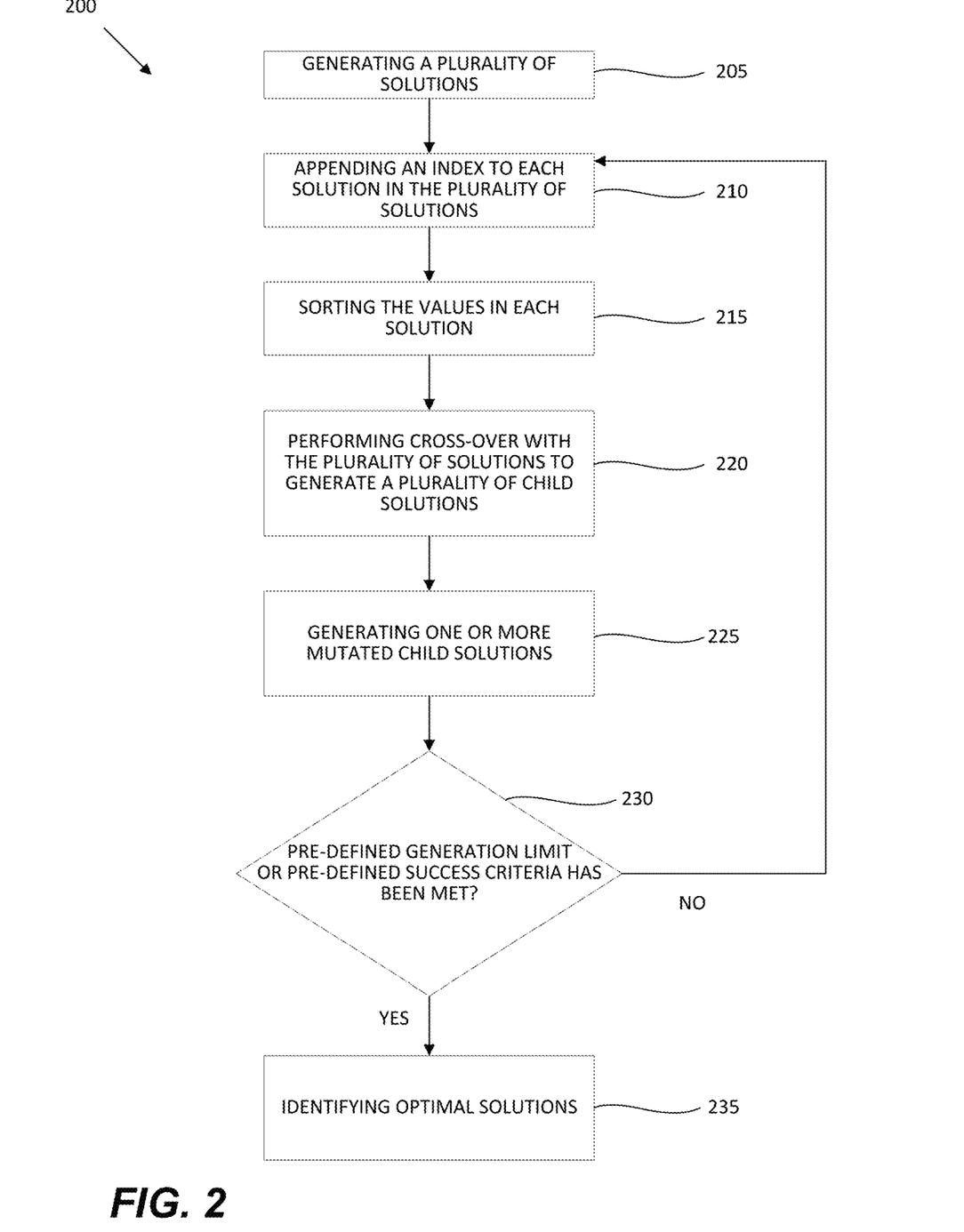
FIG. 2 is a flow diagram of a method of solving a multi-element problem using a modified genetic algorithm, in accordance with some embodiments of the present disclosure.

FIG. 2 is a flow diagram of a method 200 of solving a multi-element problem using a modified genetic algorithm iteratively. Method 200 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 200 may be performed by a computing device (e.g., computing device 110 illustrated in FIG. 1) executing optimization component 130A.

The method 200 begins at block 205, where the computing device 110 may generate a plurality of solutions to a multi-element problem for a first generation. The computing device 110 may generate the plurality of solutions in view of a set of solution criteria received from a user via computing device 140, for example. The solution criteria may include a plurality of elements which define the parameters of the solution. In turn, each solution in the plurality of solutions may include one or more values corresponding to one or more of the plurality of elements. In addition, the computing device 110 may receive a generation limit, defining a maximum number of iterations of the algorithm that should be performed. In addition to or alternatively, the computing device 110 may also receive a success criteria, indicating a threshold score and a threshold number of solutions that should achieve the threshold score. In some embodiments, the computing device 110 may generate each solution in the first generation plurality of solutions by randomly sampling the solution criteria.

For example, in a cloud configuration scenario, a user may attempt to identify certain clusters of servers (the optimized solution(s)) from among a larger number of available servers (the set of solution criteria along with the attribute to be optimized—where each available server corresponds to an element from the plurality of elements) that will provide a certain level of performance. Each server may have a set of attributes including availability, memory usage, and cost, among others. Each server may perform differently for each attribute. Thus, a user may attempt to identify clusters of servers that will provide optimal performance in view of one or more of the attributes. For example, a user may have 100 servers, and may wish to determine a cluster of 10 servers that will provide the optimal performance with respect to availability. Alternatively, the user may wish to determine a number of clusters of 10 servers each that will provide optimal performance with respect to memory usage. Thus, to generate the first generation plurality of solutions, computing device 110 may randomly assign servers from the plurality of servers into sets of 10 servers each (for a total of 10 sets), each set of 10 servers corresponding to a solution and each server in a solution corresponding to a value in that solution.

At block 210, computing device 110 may append an index to each solution in the plurality of solutions. At block 215, computing device 110 may sort the values in each solution based on how the values are represented. For example, if the values are represented numerically, then the values may be sorted in numerical order. Alternatively, if the values are represented by words or alphabets, then the values may be sorted alphabetically. At block 220 computing device 110 may perform a traditional cross-over operation on the plurality of solutions to generate a plurality of child solutions, each child solution having an index. A cross-over is a recombination operation that combines one or more values from each of two parent solutions to generate child solutions (as discussed further with respect to FIG. 3). Each solution may be combined with one or more other solutions from the plurality of solutions depending on the amount of child solutions desired at a next generation. Computing device 110 may then sort each child solution in view of its index. In some embodiments, the computing device 110 may determine whether certain solutions within the plurality of solutions are elite prior to proceeding to block 210 and may perform cross-over between non-elite solutions (as discussed further with respect to FIG. 4).

Figure 3:
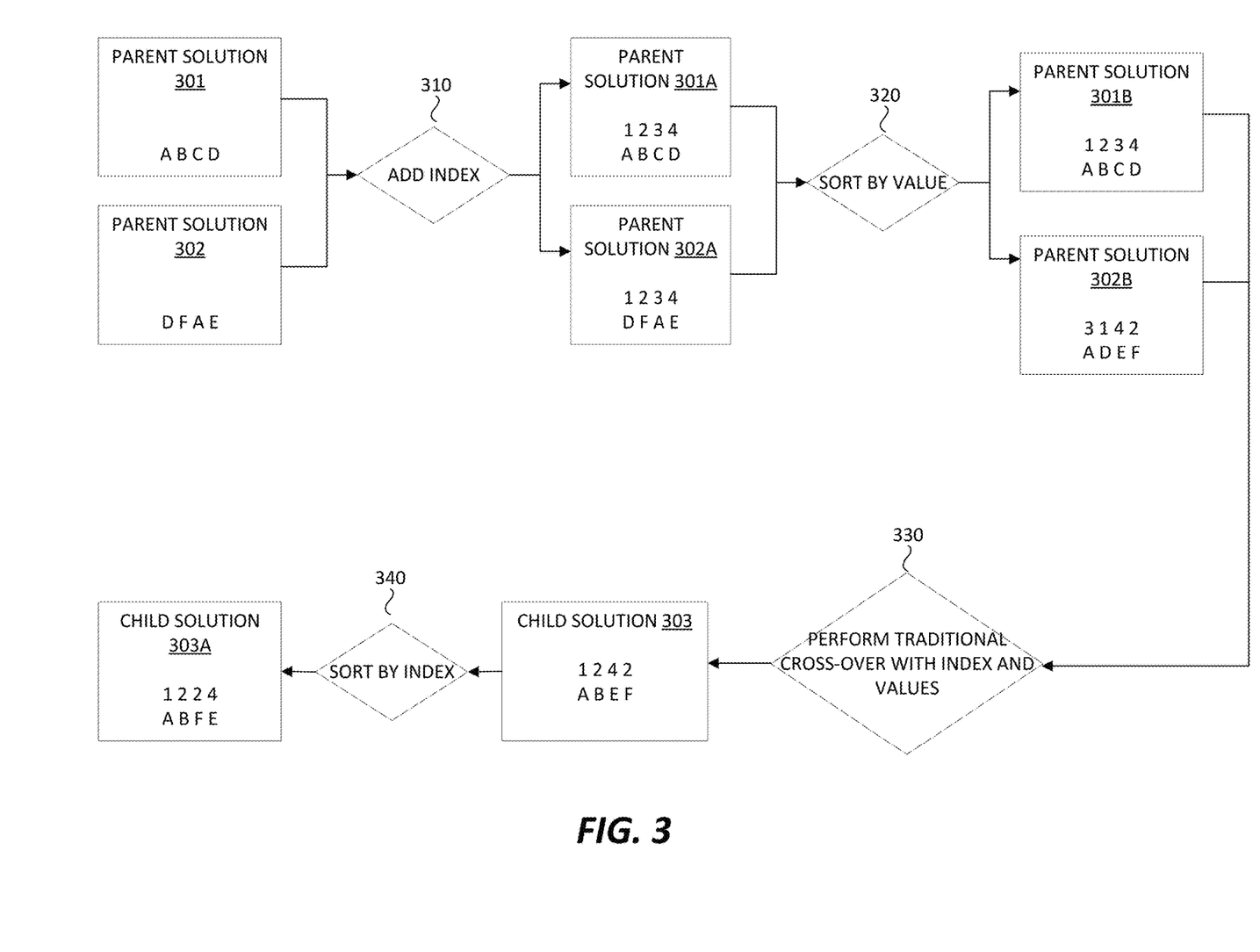
FIG. 3 is a flow diagram of a method of a modified cross-over operation, in accordance with some embodiments of the present disclosure.

FIG. 3 is a flow diagram of a method 300 further illustrating the indexing, sorting and cross-over operations discussed in blocks 210-220 of FIG. 2 with respect to two parent solutions. In some embodiments, the method 300 may also be performed by a computing device (e.g., computing device 110 illustrated in FIG. 1). FIG. 3 illustrates two parent solutions 301 and 302. Each parent solution comprises a set of values, with parent solution 301 including values "A B C D" and parent solution 302 including values "D F A E." For example, each of the values "A B C D E F" may represent an available server (part of the solution criteria) in the cloud configuration example discussed herein. At 310, computing device 110 may add an index to each parent solution, generating parent solutions 301a and 302a. As illustrated in FIG. 3, parent solutions 301a and 302a each have a numerical index "1 2 3 4." At 320, computing device 110 may sort each parent solution 301a and 302a in view of their respective values, resulting in parent solutions 301b and 302b. As can be seen in FIG. 3, parent solution 301b was already arranged in view of its values, while parent solution 302b's values are now arranged as "A D E F" as compared with "D F A E" from parent solution 302a. In this manner, computing device 110 may combine parent solutions having duplicate values (e.g., both 301b and 302b have "A" and "D") without generating child solutions having multiple instances of the same value (an incorrect solution if the solution criteria includes constraints on the number of times a value can appear). Referring again to the cloud configuration example, it would be impossible to have more than one instance of the same physical server in a cluster of servers (a duplicate constraint). Thus, method 300 allows solutions that share a value to be combined, without violating the duplicate constraint. At 330, computing device 110 may perform a traditional cross-over operation (as described above) with parent solutions 301b and 302b, resulting in child solution 303.

As can be seen in FIG. 3, the second value of each parent solution has been chosen as the cross-over point, such that the "A B" values of parent solution 301b have been combined with the "E F" values from parent solution 302b resulting in a child solution 303 having values "A B E F."

Child solution 303 also includes an index, "1 2 4 2" which is a combination of the first two index values from parent solution 301b with the last two index values of parent solution 302b. Although illustrated as using the second value of the parent solutions as the cross-over point, any appropriate point may be chosen as the cross-over point, such as after the first value. In such a case, a cross-over combining one value from parent solution 301b and three values from parent solution 302b would be performed, resulting in a child solution having values "A D E F." At 340, the computing device 110 may sort the child solution 303 in view of its index values, resulting in child solution 303a which has values "A B F E" and an index "1 2 2 4."

Referring back to FIG. 2, at block 225, the computing device 110 may generate one or more mutated child solutions. More specifically, for each of one or more child solutions, computing device 110 may randomly select two values and rearrange them, thereby generating one or more mutated child solutions. In some embodiments, the computing device 110 may utilize a random number generator to select the two values. At block 230, the computing device 110 may determine whether a generation limit or a success criteria has been met. If neither has been met, then the computing device 110 may begin another iteration of the process, and may return to block 205, where the one or more mutated child solutions become the next generation of the plurality of solutions, instead of computing device 110 generating another plurality of solutions. If either the generation limit or the success criteria has been met, then computing device 110 may identify a top percentage of the mutated child solutions and/or may identify the mutated child solutions that have met or exceeded the success criteria.

Figure 4:
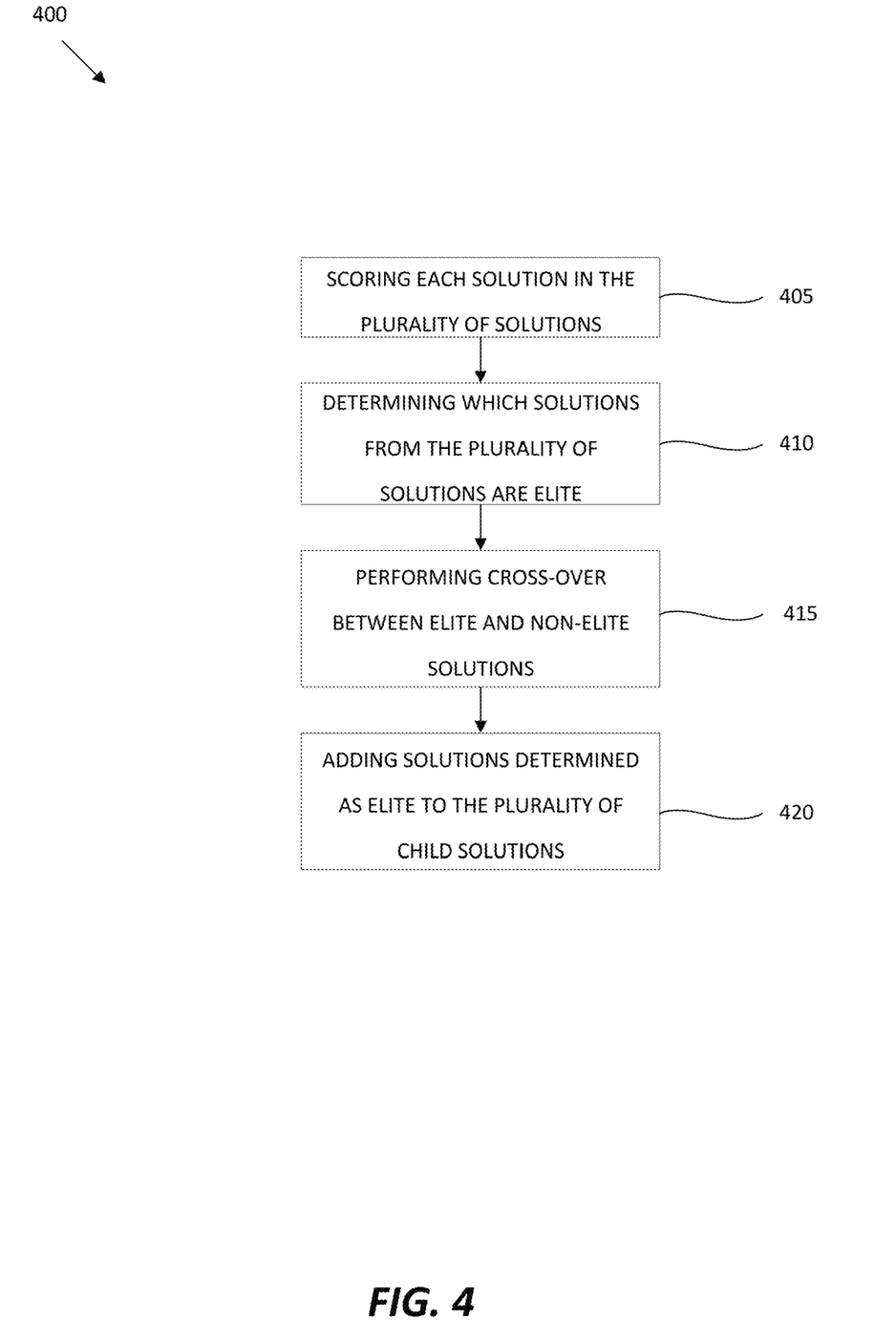
FIG. 4 is a flow diagram of a method of determining elite solutions in accordance with some embodiments of the present disclosure.

In some embodiments, the computing device 110 may determine which solutions from the plurality of solutions are elite before performing the modified cross-over operations discussed with respect to blocks 210-220. FIG. 4 illustrates a flow diagram of a method 400 illustrating a method for performing cross-over between elite and non-elite solutions. The method 400 starts at block 405, where each solution in the plurality of solutions (generated at block 205 of FIG. 2) is scored. At block 410, computing device 110 may determine which solutions from the plurality of solutions is elite. More specifically, computing device 110 may compare each solution's score to an elitism threshold and identify as elite, those solutions having a score that meets or exceeds the elitism threshold. At block 415, computing device 110 may perform the modified cross-over (as described with respect to blocks 210-220 of FIG. 2) between non-elite solutions to generate the plurality of child solutions. At block 420, computing device 110 may add the elite solutions to the plurality of child solutions before proceeding as described with respect to block 225 of FIG. 2.

Figure 5:
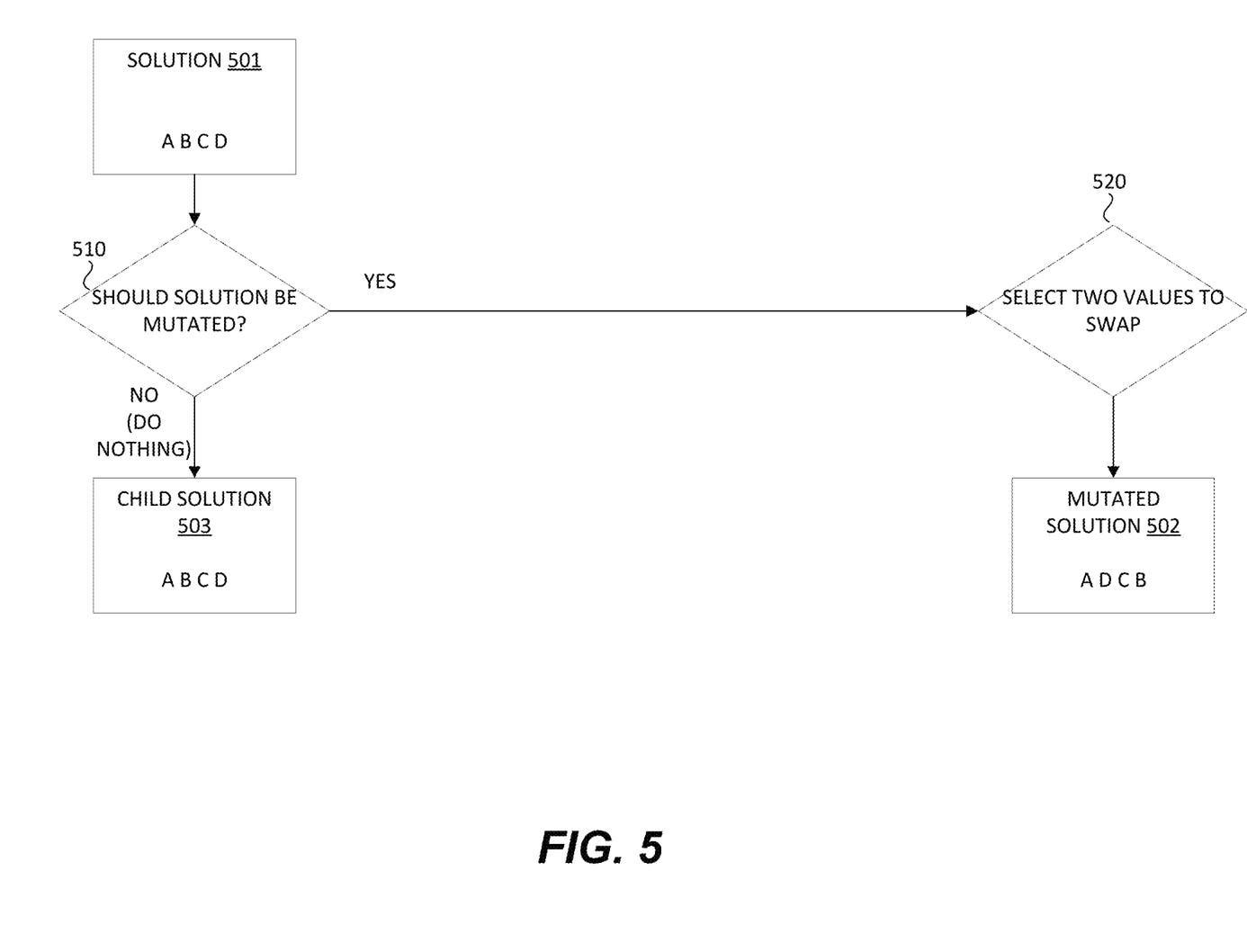
FIG. 5 is a flow diagram of a method of a modified mutation operation, in accordance with some embodiments of the present disclosure.

FIG. 5 is a flow diagram of a method 500 further illustrating the mutation operation in block 225 of FIG. 2 with respect to a child solution. FIG. 5 illustrates a child solution 501 having values "A B C D." At block 510 computing device 110 may determine whether the child solution 501 should be mutated. More specifically, computing device 110 may generate a random number for child solution 501 and compare the random number to a mutation threshold. If the random number does not meet or exceed the mutation threshold, then computing device may decide not to mutate child solution 501 resulting in child solution 503 having values "A B C D." If the random number meets or exceeds the mutation threshold then computing device 110 may decide to mutate child solution 501. At 520, the computing device 110 may select two values from the child solution 501 to perform a mutation with. As discussed above, computing device 110 may use a random number generator to select the two values. In the example illustrated in FIG. 5, values "B" and "D" are selected and their positions interchanged resulting in mutated child solution 502 having values "A D C B."

Figure 6:
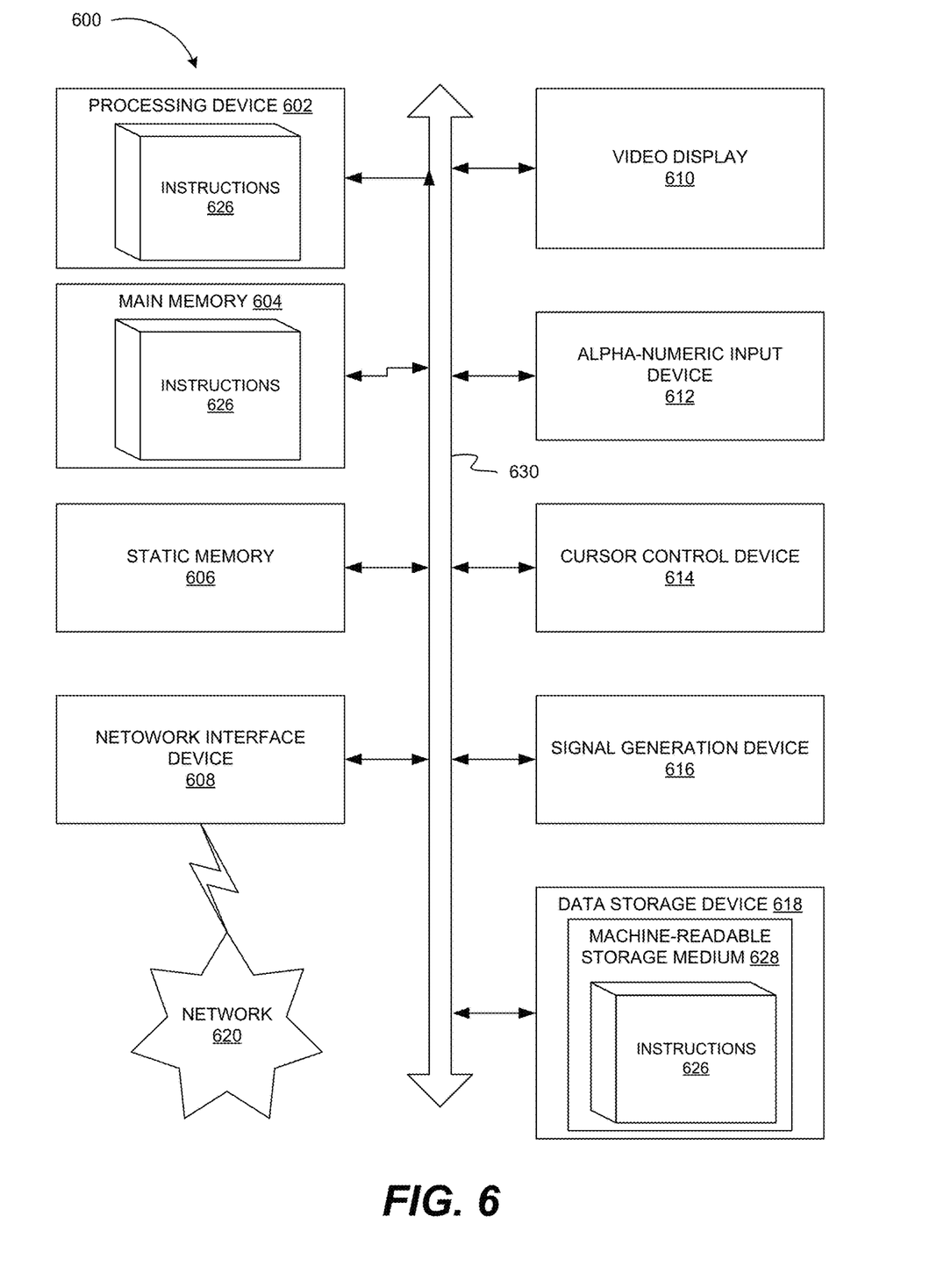
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions, e.g., instructions for carrying out the operations described herein, in accordance with one or more aspects of the present disclosure. Instructions implementing module 626 may also reside, completely or at least partially, within main memory 604 and/or within processing device 602 during execution thereof by computing device 600, main memory 604 and processing device 602 also constituting computer-readable media. The instructions may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different components and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, and/or components, but do not preclude the presence or addition of one or more other features, integers, steps, operations, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the embodiments to the precise forms disclosed. Many modifications and variations are possible in view of the above teachings. Accordingly, the present embodiments are to be considered as illustrative and not restrictive, and the embodiments are not to be limited to the details given herein, but may be modified within the scope and equivalents of the appended claims.

What is claimed is:

1. A method comprising:
generating a plurality of solutions to a multi-element problem, wherein each solution in the plurality of solutions comprises a set of servers from among a plurality of servers that comprise a set of solution criteria that defines parameters for each of the plurality of solutions and wherein each of the plurality of servers has one or more attributes including availability and memory usage;

iteratively, over one or more generations:
appending, by a processing device, an index to each solution in the plurality of solutions and sorting the servers in each solution;
for each solution in the plurality of solutions, combining one or more servers from the solution with one or more servers from another solution in the plurality of solutions to generate a plurality of child solutions, each child solution having an index, and sorting the servers in each child solution in view of the child solution's index; and
for one or more child solutions in the plurality of child solutions, rearranging two selected servers to generate one or more mutated child solutions.

2. The method of claim 1, further comprising:
identifying optimal solutions responsive to determining that a generation limit or a success criteria has been met; and
continuing to a next generation responsive to determining that neither the generation limit or the success criteria has been met, wherein the mutated child solutions act as the plurality of solutions in the next generation.

3. The method of claim 2, wherein identifying optimal solutions comprises:
identifying a top percentage of the one or more mutated child solutions if the generation limit has been met; and
identifying mutated child solutions that meet or exceed a score threshold if the success criteria has been met.

4. The method of claim 1, further comprising:
scoring each solution in the plurality of solutions;
determining which solutions from the plurality of solutions are elite in view of each solution's score and an elitism threshold; and
adding solutions determined as elite to the plurality of child solutions, wherein the combining is performed between non-elite solutions.

5. The method of claim 1, wherein the one or more mutated child solutions are optimized across the set of solution criteria.

6. The method of claim 1, further comprising:
for each child solution in the plurality of child solutions:
generating a random number; and
determining whether the random number is below a threshold, wherein mutated child solutions are generated for child solutions having a random number greater than or equal to the threshold.

7. The method of claim 1, wherein the one or more attributes further comprise cost and wherein the set of solution criteria further comprises an indication of which of the one or more attributes are to be optimized.

8. A system, comprising:
a memory;
a processing device operatively coupled to the memory, the processing device to:
generate a plurality of solutions, wherein each solution in the plurality of solutions comprises a set of servers from among a plurality of servers that comprise solution criteria that defines parameters for each of the plurality of solutions, and wherein each of the plurality of servers includes one or more attributes including availability and memory usage, and an indication of which of the one or more attributes are to be optimized;
iteratively, over one or more generations:
append, by the processing device, an index to each solution in the plurality of solutions and sort the servers in each solution;
for each solution in the plurality of solutions, combine one or more servers from the solution with one or more servers from another solution in the plurality of solutions to generate a plurality of child solutions, each child solution having an index, and sort the servers in each child solution in view of the child solution's index; and
for one or more child solutions in the plurality of child solutions, rearrange two selected servers to generate one or more mutated child solutions.

9. The system of claim 8, wherein the processing is device further to:
identify optimal solutions responsive to determining that a generation limit or a success criteria has been met; and
continue to a next generation responsive to determining that neither the generation limit or the success criteria has been met, wherein the mutated child solutions act as the plurality of solutions in the next generation.

10. The system of claim 9, wherein to identify optimal solutions, the processing device is further to:
identify a top percentage of the one or more mutated child solutions if the generation limit has been met; and
identify mutated child solutions that meet or exceed a score criteria if the success criteria has been met.

11. The system of claim 8, wherein the processing device is further to:
score each solution in the plurality of solutions;
determine which solutions from the plurality of solutions are elite in view of each solution's score and an elitism threshold; and
add solutions determined as elite to the plurality of child solutions, wherein the combining is performed between non-elite solutions.

12. The system of claim 8, wherein the one or more mutated child solutions are optimized across the set of solution criteria.

13. The system of claim 8, wherein the processing device is further to:
for each child solution in the plurality of child solutions:
generate a random number; and
determine whether the random number is below a threshold.

14. The system of claim 13, wherein the processing device generates mutated child solutions for child solutions having a random number greater than or equal to the threshold.

15. A non-transitory computer-readable storage medium including instructions that, when executed by a processing device, cause the processing device to:
generate a plurality of solutions, wherein each solution in the plurality of solutions comprises a set of servers from among a plurality of servers that comprise solution criteria that defines parameters for each of the plurality of solutions, and wherein each of the plurality of servers includes one or more attributes including availability and memory usage, and an indication of which of the one or more attributes are to be optimized;
iteratively, over one or more generations:
append, by the processing device, an index to each solution in the plurality of solutions and sort the servers in each solution;
for each solution in the plurality of solutions, combine one or more servers from the solution with one or more servers from another solution in the plurality of solutions to generate a plurality of child solutions, each child solution having an index, and sort the servers in each child solution in view of the child solution's index; and for one or more child solutions in the plurality of child solutions, rearrange two selected servers to generate one or more mutated child solutions.

16. The non-transitory computer-readable storage medium of claim 15, wherein the processing is device further to:

identify optimal solutions responsive to determining that a generation limit or a success criteria has been met; and continue to a next generation responsive to determining that neither the generation limit or the success criteria has been met, wherein the mutated child solutions act as the plurality of solutions in the next generation.

17. The non-transitory computer-readable storage medium of claim 16, wherein to identify optimal solutions, the processing device is further to:

identify a top percentage of the one or more mutated child solutions if the generation limit has been met; and identify mutated child solutions that meet or exceed a score criteria if the success criteria has been met.

18. The non-transitory computer-readable storage medium of claim 17, wherein the processing device is further to:

for each child solution in the plurality of child solutions:
generate a random number; and
determine whether the random number is below a threshold, wherein the processing device generates mutated child solutions for child solutions having a random number greater than or equal to the threshold.

19. The non-transitory computer-readable storage medium of claim 15, wherein the processing device is further to:

score each solution in the plurality of solutions;
determine which solutions from the plurality of solutions are elite in view of each solution's score and an elitism threshold; and
add solutions determined as elite to the plurality of child solutions, wherein the combining is performed between non-elite solutions.

20. The non-transitory computer-readable storage medium of claim 15, wherein the one or more mutated child solutions are optimized across the set of solution criteria.

* * * * *